D. E. Somes,

Cooling Apps.

No. 112,294. Patented Feb. 28. 1871.

Inventor;
D. E. Somes.

Witnesses;
F. E. Somes
L. Somes

N. PETERS, PHOTO-LITHOGRAPHER, WASHINGTON, D. C.

5. Sheets, Sheet. 2.

D. E. Somes,

Cooling App's.

No. 112,294. Patented Feb. 28. 1871

Inventor;
D. E. Somes.

Witnesses;
F. Somes.
L. Somes

N. PETERS, PHOTO-LITHOGRAPHER, WASHINGTON, D. C.

5 Sheets, Sheet 3.

D. E. Somes,

Cooling Appts.

No. 112,294. Patented Feb. 28, 1871.

Inventor;
D. E. Somes

Witnesses;
H. C. Somes.
L. Somes

N. PETERS, PHOTO-LITHOGRAPHER, WASHINGTON, D. C.

5 Sheets. Sheet. 4.

D. E. Somes,

Cooling Appr's.

No. 112,294. Patented Feb. 28, 1871.

Witnesses;
T. Somes,
L. Somes

Inventor;
D. E. Somes

N. PETERS, PHOTO-LITHOGRAPHER, WASHINGTON, D. C.

5 Sheets, Sheet 5.

D. E. Somes,

Cooling Apps.

No. 112,294. Patented Feb. 28. 1871.

Witnesses:
F. C. Somes,
L. Somes

Inventor:
D. E. Somes.

N. PETERS, PHOTO-LITHOGRAPHER, WASHINGTON, D. C.

UNITED STATES PATENT OFFICE.

DANIEL E. SOMES, OF WASHINGTON, DISTRICT OF COLUMBIA.

IMPROVEMENT IN COOLING, FREEZING, AND PRESERVING SOLIDS, LIQUIDS, AND GASES.

Specification forming part of Letters Patent No. 112,294, dated February 28, 1871.

*To all whom it may concern:*

Be it known that I, DANIEL E. SOMES, of Washington, in the county of Washington, and in the District of Columbia, have invented a new and useful Improvement in Devices for Cooling or Freezing and Aerifying Liquids; and I do hereby declare that the following is a full, clear, and exact description thereof, reference being had to the annexed drawing, making part of this specification, in which—

Figure 2:
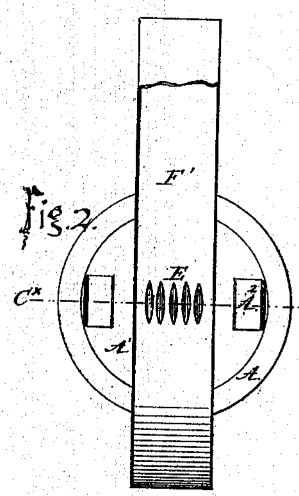
Figure 3:
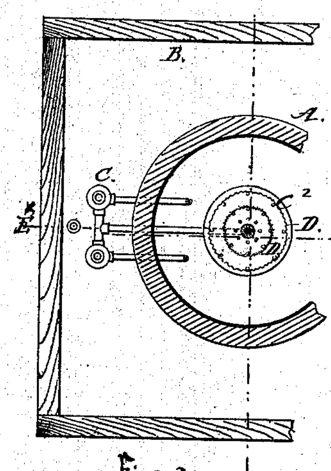
Figure 1:
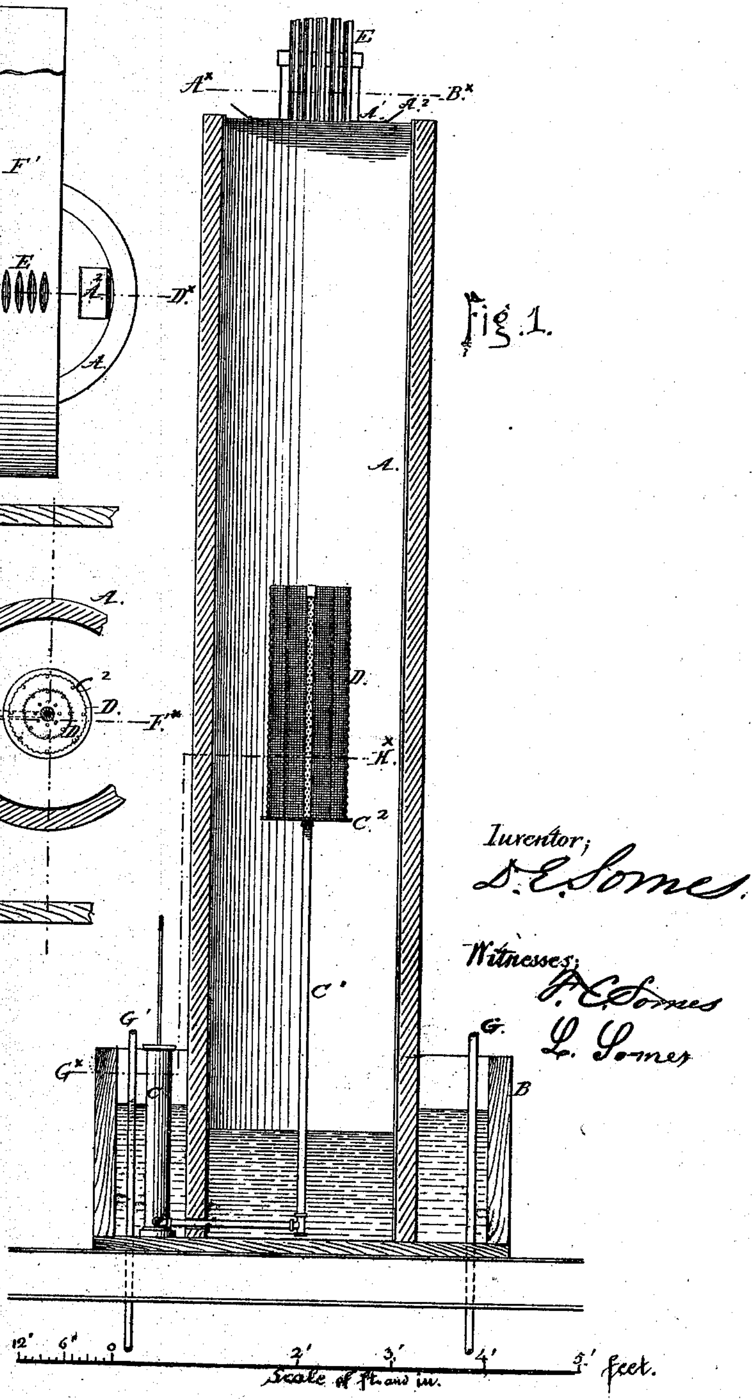
Figure 4:
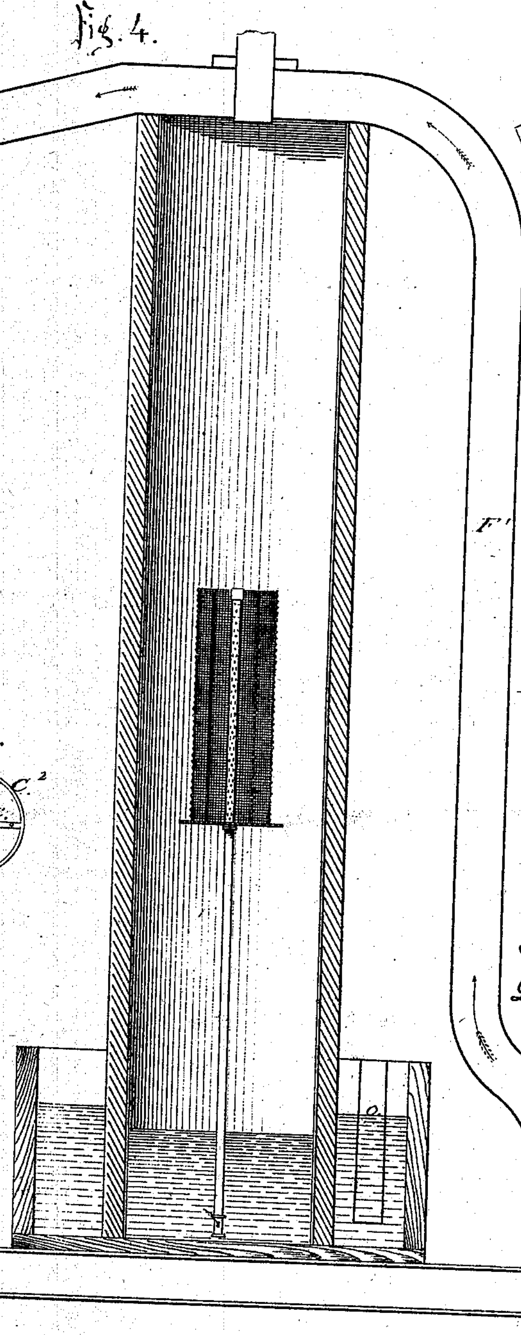
Figure 5:
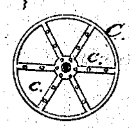
Figure 6:
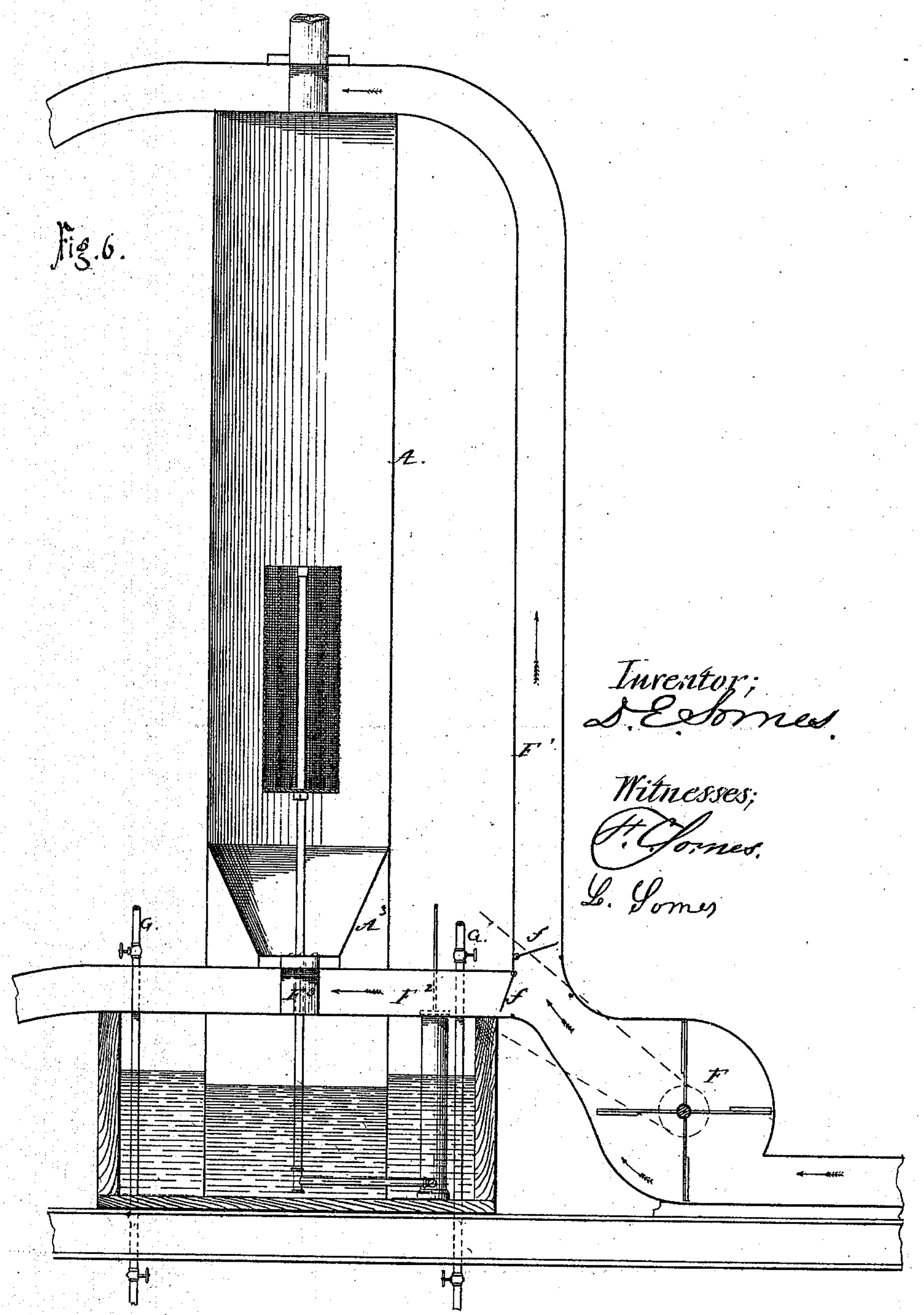
Figures 7, 8:
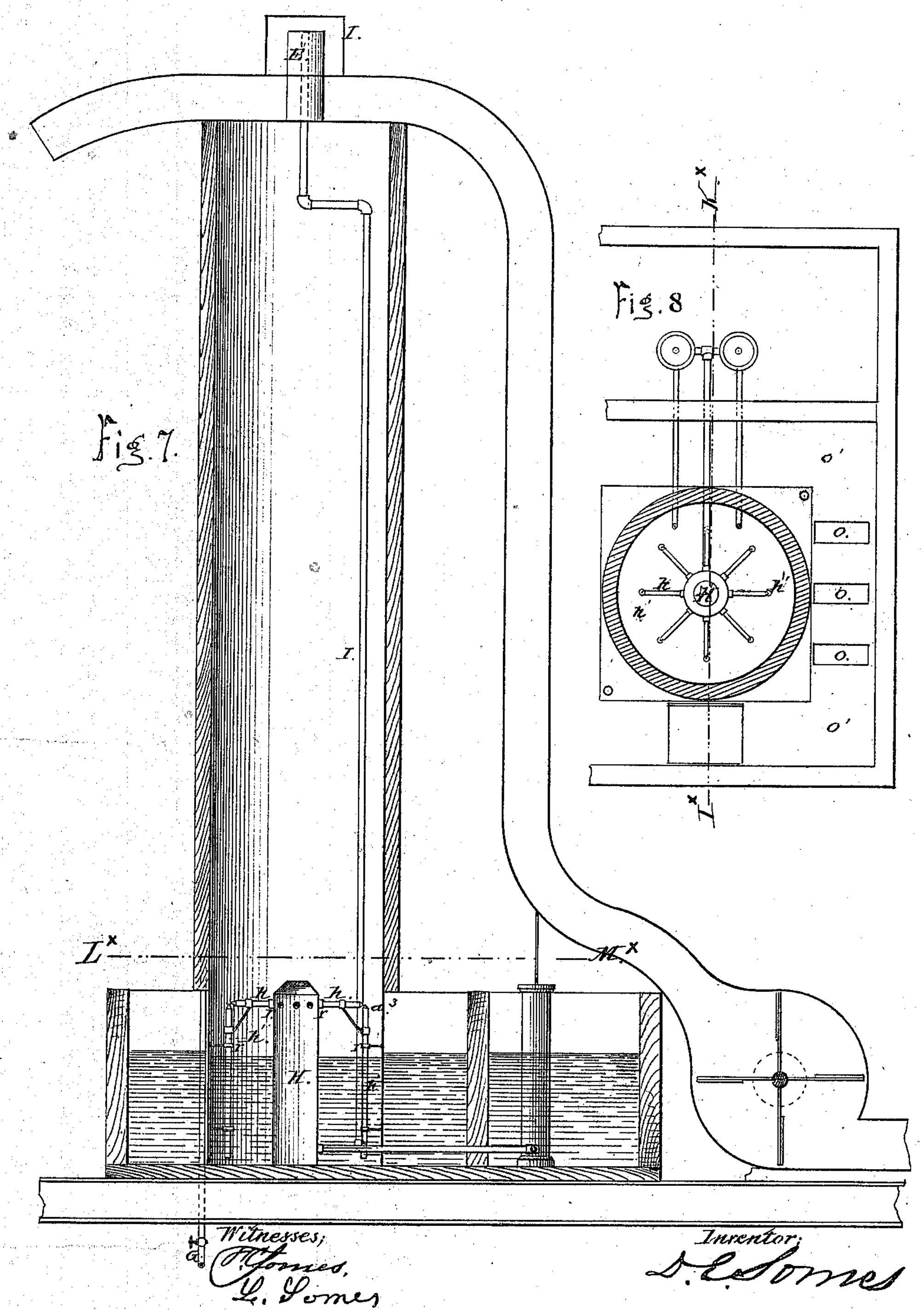
Figure 9:
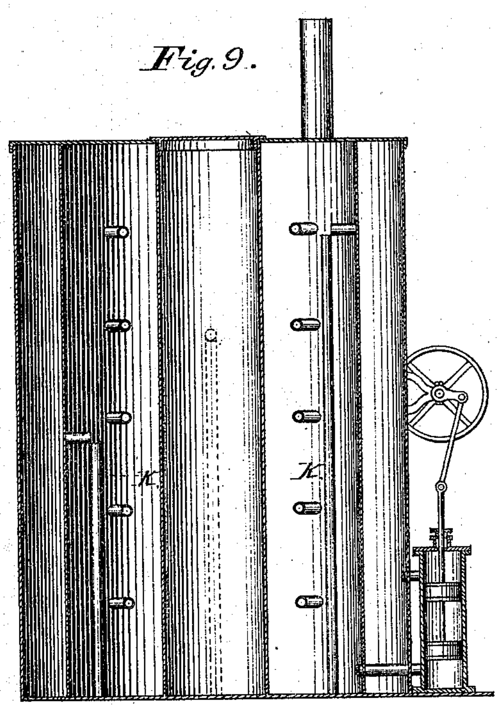
Figure 10:
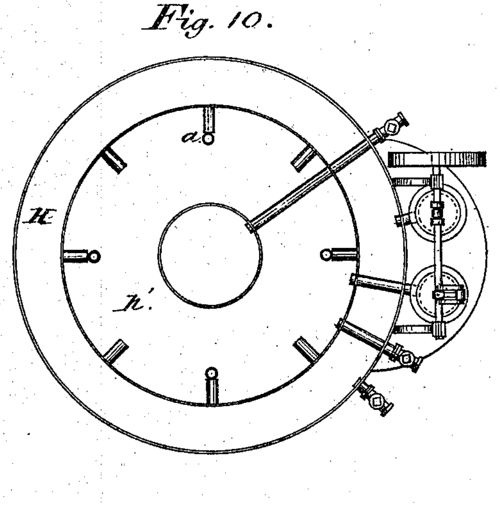

Figure 1 represents a vertical section on line $E^{\times}$ $F^{\times}$ of Fig. 3, showing one form of my improved apparatus for cooling and aerifying various substances. Fig. 2 is a horizontal section on line $A^{\times}$ $B^{\times}$ of Fig. 1, showing in plan view the upper portion of the apparatus only. Fig. 3 is a horizontal section on line $G^{\times}$ $G^{\times}$, Fig. 1. Fig. 4 is a vertical section of this form of apparatus, taken on a line at right angles to the section shown in Fig. 1. Fig. 5 is a plan view of the frame or disk which supports the gauze cylinders or tubes for atomizing liquids. Fig. 6 is a vertical section of the apparatus somewhat modified in construction, for purposes hereinafter to be more fully explained. Fig. 7 is another form of my apparatus, showing it in vertical section on line $I^{\times}$ $K^{\times}$ of Fig. 8. Fig. 8 is a horizontal section thereof, taken in a plane indicated by line $L^{\times}$ $M^{\times}$ in Fig. 7. Fig. 9 represents a vertical section of still another form of my apparatus. Fig. 10 is a plan view of the latter with the top removed.

The same letters of reference are employed in all the figures in the designation of identical parts.

This invention relates to apparatus for cooling and aerifying various substances, such as gases, liquids, perishable articles of food, &c., it being also applicable for the manufacture of ice; and my improvement consists in the construction, combination, and arrangement of various parts of such apparatus, as will be more specifically indicated in thefollowing description and claims.

To enable those skilled in the art to make and use my invention, I will proceed to describe its construction and mode of operation.

The form of apparatus shown in Figs. 1 to 5 is more especially designed to be used in connection with preserving and refrigerating tanks, and for cooling air to be conducted into apartments below. It consists, essentially, of an upright shaft, A, shown as cylindrical in form, but which may have any other form of convenient height and diameter, which rests with its lower end in the center of a large tank, B, in which the articles to be preserved are placed, either directly or in secondary receptacles. That portion of this shaft or cylinder which extends above the tank B is constructed with double walls, packed with some good non-conductor of heat; but its lower termination, which enters the tank, has a single wall only, to permit of the ready conduction of heat or cold. The top of the shaft is closed by a head, $A^1$, in which valves $A^2$ are arranged, so that a communication between the interior of the shaft and the external atmosphere may be opened whenever it is desirable or necessary. A pump or pair of pumps, C, is placed in the tanks B, in close proximity to the shaft A. These pumps are operated in any convenient manner, and are arranged to draw any liquid which may be poured into the shaft A, and force it back into said shaft through a pipe, $C^1$, which rises in the same to about the middle of its height, being plugged at its upper end. The upper length or portion of this pipe is finely perforated, to discharge the liquid in a comminuted state in horizontal directions; and at the lower end of this perforated portion the pipe carries a horizontal frame or disk, $C^2$, which is constructed with two or more annular series of pins or bars, *c*, standing up vertically. This disk or frame is provided for the support of one or more pipes or cylinders, D, made of very fine wire-cloth or other similar material, by which the comminuting or atomizing of the liquids discharged from the tube is still more effected. The vertical pins of the disk will serve to hold these tubes of gauze in proper position, at the same time admitting of easy removal and reinsertion. By using fewer or more of these tubes of gauze the liquid will be atomized to a greater or less extent, as may be required. Upon the top of the shaft a number of vertical tubes E, are placed, opening into the shaft, and either open at their upper ends or controlled by suitable valves. (Not shown in the drawing.)

The tubes are made, by preference, of an oval or flat shape, as clearly shown in Fig. 2, and covered with fibrous material, which is kept moist from a reservoir containing water or other liquid, which is caused to drip upon such covering.

F represents an ordinary fan-blower, placed in any suitable position near the tank B, and may be driven from the same shaft which gives motion to the pump-pistons. The blast of air created by this blower is conducted through a duct, $F^1$, and directed against the edges of the pipes E, to cause a rapid evaporation of the moisture contained in their fibrous coverings, by which evaporation the air or vapors in the tubes will be reduced in temperature.

Rooms or apartments below the one in which the apparatus is placed are connected with it by suitable pipes G, which should be provided with valves or cocks to open or close communication, at pleasure.

In operating this apparatus, to use it for cooling and refrigerating purposes, a quantity of water or brine, or ether and volatile liquids, according to the degree of cold to be produced, is poured into the shaft A, and the pump or pumps started. The liquid, issuing in a fine spray from the discharge-pipe of the pump and wire-cloth tubes or cylinders surrounding it, parts with a portion of its latent heat, and much more readily evaporizes, in which it abstracts constantly heat from the air contained in the shaft, thus reducing its temperature until the necessary degree of cold has been obtained in its lower end, which communicates such cold to the surrounding tank and receptacles in it.

To aid in more rapidly reducing the temperature in the shaft, as well as to recondense the vapors of the liquid, the blower may be put in operation to cause a current of air to rapidly evaporate the moisture in the coverings of the tubes E, and thus reduce their temperature and that of the air in them or passing through them. The rising vapors, meeting with the cold surface of these tubes, immediately condense, and are returned into the shaft to be utilized over again.

The evaporation may be still further quickened by opening the valves in the top of the shaft, which also serve to admit of a person entering it for making repairs or for other purposes. By opening these valves, fresh air can at any time be admitted into the shaft for aerifying the water or other liquid in it, to prevent its getting ropy and stale.

Where not an intense cold needs to be produced, the operation of the pumps may be stopped, and the blower and evaporating-tubes employed only.

Wherever it is admissible, the shaft should be carried up to a considerable height—say fifty feet or more—as a high shaft will very materially aid in producing the results heretofore described.

This apparatus is especially applicable for household purposes and on shipboard, for cooling and aerifying water and other liquids without the use of ice. The blower and evaporating-tubes are in these cases dispensed with, and only the shaft containing the atomizing apparatus, with a small force-pump, employed.

The liquid to be cooled and aerified is kept in the shaft and subjected to the treatment already set forth whenever occasion calls for it. Beer, ale, wine, &c., may be thus cooled and kept fresh and sparkling.

In the apparatus shown in Fig. 6, the air-duct $F^1$ has a branch, $F^2$, passing over the tank B and through the shaft A, where a number of vertical evaporating-tubes, $F^3$, are inserted in this branch duct, opening above and below it.

At the junction of the main duct F and its branch, valves *f* are arranged in them, by which the direction of the blast may be controlled.

Just above the branch the shaft is constructed with a funnel-shaped diaphragm, $A^3$, in the bottom of which the upper ends of the evaporating-tubes $F^3$ are fitted, so that any moisture or liquid running down the wall of the shaft will be conducted from this funnel upon the fibrous covering of these tubes, to be evaporated by the passing currents of air. The shaft, in this instance, is to be covered with fibrous material upon the outside, and lined in a similar manner upon its interior down to the funnel, and streams of water or other liquid are employed to continually wet its exterior, while its interior is besprinkled by the atomizer. Thus abundant means for evaporation are provided, in consequence of which the temperature of the shaft and the liquid contained therein can be reduced very rapidly.

This method of covering and lining the shaft A, to aid in reducing the temperature of its contents by the evaporation of liquids on it, may be employed in the apparatus already described, as well as in other forms still to be mentioned.

In Figs. 7 and 8 the apparatus is somewhat modified in construction by the substitution of another form of atomizer, which consists of an air-chamber, H, placed in the bottom of the shaft, with a number of horizontal tubes, *h*, radiating from it near the top. These tubes terminate in nozzles, as shown, and each one discharges a blast of air directly over the nozzle end of a tube, *h'*. There are as many of the latter as there are tubes *h'*.

The lower ends of the tubes *h'* are immersed in the liquids in the shaft, which, by the action of the blasts passing over these tubes, is drawn up into them, and, meeting with the blast as it issues from the nozzles, is blown into a fine spray. The pumps are, in this instance, air-pumps, drawing the air through a suction-pipe, I, from the top of the shaft. This pipe may be arranged upon the outside of the shaft, in which case I propose to surround it with a jacket of ice or other cooling substances, so that the ingoing current of air may be cooled in its passage to the pumps.

I′ represents a box placed upon the top of the shaft, and inclosing the upper evaporating-tubes.

The suction-pipe I issues into this box, so that all the air is compelled to pass from the shaft through the evaporating-tubes before it can enter the suction-pipe, whereby it is dried before it again enters the pumps to be forced back into the shaft.

The air-duct connected with the blower may be made continuous, and the same air used over again. This has the advantage that volatile liquids can then be used to wet the evaporating-tubes, the vapor of such liquids being condensed upon condensing-tubes in the duct and caught up in any suitable manner to be used over again.

The apparatus shown in Figs. 9 and 10 consists of three compartments, one within the other. The outer chamber is air-tight, with a number of tubes opening into the middle chamber and directed toward the central compartment, which latter serves as a receptacle for articles to be preserved or frozen.

In the middle apartment a quantity of liquid is poured, immersing the lower ends of upright tubes K, which terminate under the tubes of the outer or air chamber. As the air is blown through these latter tubes the liquid is drawn up into the tubes K and thrown in a fine mist against the wall of the central chamber.

Figure 11:
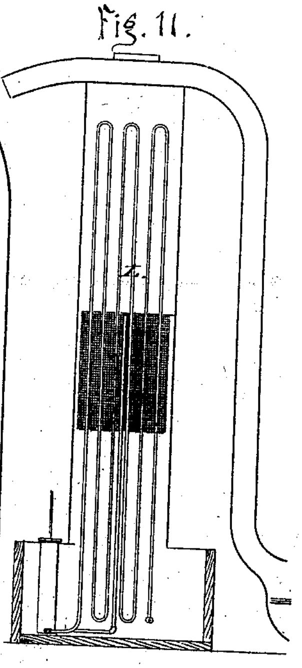

The modification of the apparatus, as shown in Fig. 11, consists in the employment of a condenser within the shaft for the purpose of condensing the rising vapors.

The condenser is composed of a coil of pipe, L, through which a constant flow of liquid is maintained by the pumps.

Among others I may name the following liquids I propose to use in connection with this apparatus: Ether, ammonia, naphtha, gasoline, rhigoline, and other volatile liquids, such as have been enumerated by me in some of my patents, or their equivalents. The atomizing-tubes are jointed at *r r r r*, to facilitate their removal and readjustment.

Where this apparatus is used for cooling buildings, apartments, cars, ships, and other vessels, it is constructed substantially as shown in Fig. 6, with the addition of a fibrous covering and lining of the shaft, as hereinbefore fully set forth.

As electricity is a decomposing agent, and is especially destructive to fresh meats, milk, fruits, and the like, a part of my invention consists in so constructing and arranging my apparatus as to have the electricity conducted from the articles to be preserved and the vessel or chamber containing them.

This I accomplish, first, by placing said articles in metallic boxes or vessels surrounded by a glass or other non-conducting casing, with a conductor connected with the minor vessel, and extending into the ground or a body of water or moisture.

The metallic vessel should be lined with tin, wood, or other material which will not deleteriously affect the articles to be preserved.

Second, I employ glass vessels, with good non-conductors of heat and cold, as air-chambers, between double or multiple walls or chambers packed with sawdust, charcoal, and the like, surrounding said glass vessel, and having a conducting-rod extend from the interior of the vessel into the ground or some attractive point.

Thus I am enabled by my invention to preserve food and other perishable articles by various means—namely, lowering the temperature within a given space by excluding the heat therefrom; or by atomizing liquids and conducting the latent heat therefrom by means of evaporation artificially produced; by means of ice, and ice and salt, or other cold mixture, as set forth in former patents granted to me; and by the employment of means to conduct electricity from the vessels containing articles to be preserved. I also apply carbonic acid, in the form of gas or otherwise, or carbolic acid, to the things to be preserved, or around the vessel containing them.

What I claim as my invention, and desire to secure by Letters Patent, is—

1. The process of preserving food, hides, or other animal or vegetable substances by the application of cold to tight vessels, in which the same are placed, and the conduction of the electricity therefrom, substantially as set forth.

2. The method of atomizing liquids by forcing them against wire-gauze, or its equivalent.

3. The atomizing device C $C^1$ D, in combination with the shaft A, substantially as set forth.

4. The elements in the preceding clause, in combination with the tank B, substantially as set forth.

5. The combination of the atomizing devices C $C^1$ D, shaft A, evaporating-tubes E, and blower F $F^1$, substantially as set forth.

6. The combination of the shaft A, box I′, evaporating-tubes E, pumps C, air-chamber H *h*, and tubes *h′*, substantially as shown in Figs. 7 and 8.

7. The combination of the shaft A, atomizing devices C $C^1$ D, and condenser L, substantially as set forth.

D. E. SOMES.

Witnesses:
F. C. SOMES,
B. R. SOMES.